United States Patent [19]

Bernett et al.

[11] Patent Number: 4,526,832
[45] Date of Patent: Jul. 2, 1985

[54] ANTISTATIC PACKAGING MATERIAL AND STEEL SUBSTRATES PACKAGED THEREWITH

[75] Inventors: Marianne K. Bernett; David C. Weber, both of Alexandria, Va.; Harold Ravner, Bethesda, Md.

[73] Assignee: The United States of America as represented by the Secretary of the Navy, Washington, D.C.

[21] Appl. No.: 534,477

[22] Filed: Sep. 21, 1983

[51] Int. Cl.³ .................. B32B 27/08; B05D 3/06; H01B 1/02; B21D 53/10
[52] U.S. Cl. ............................ 428/336; 428/340; 428/461; 428/462; 428/500; 428/519; 428/520; 428/516; 427/38; 528/373; 252/500; 250/492.2; 29/149.5 B; 29/149.5 NM; 29/724; 29/DIG. 8

[58] Field of Search .............. 428/500, 336, 519, 516, 428/520, 461, 462; 427/38; 252/500; 528/373

[56] References Cited

U.S. PATENT DOCUMENTS

| 4,115,334 | 9/1978 | Gerow | 428/520 X |
| 4,148,966 | 4/1979 | Davies | 528/373 X |
| 4,333,968 | 6/1982 | Nahmias | 428/519 X |
| 4,419,277 | 12/1983 | Myers | 252/500 |

Primary Examiner—Patricia C. Ives
Attorney, Agent, or Firm—Robert F. Beers; William T. Ellis; Barry A. Edelberg

[57] ABSTRACT

A novel antistatic packaging material and method employing a $F^+$-implanted electractive polymer are described. The implanted polymer contacts the surface of the substrate and conducts away any static charge that may exist upon the substrate.

15 Claims, 8 Drawing Figures

ANTISTATIC PACKAGING MATERIAL AND STEEL SUBSTRATES PACKAGED THEREWITH

FIELD OF THE INVENTION

This disclosure relates generally to antistatic packaging materials and more specifically to antistatic materials incorporating an electroactive polymer.

BACKGROUND OF THE INVENTION

Precision instrument bearings and other delicate instrument components, such as electronic devices, are extremely sensitive to atmospheric particulate contamination. To prevent the accumulation of electrostatic charges during transport or storage, these components are often packaged in antistatic polyethylene or nylon containers. As shown in earlier studies, long-chain surface seeking surfactants, currently used as antistatic agents, produce adverse effects after extended contact with bearing steel surfaces and their lubricants: migration of the antistatic agent from the polymer surface to the lubricant and ultimately to the bearing surface causes physical or chemical changes in the lubricant and/or nonwettability of the bearing by the lubricant. Concern for improvement, therefore, has elicited a search for alternate packaging materials whose conductive properties do not depend upon the incorporation of surface-seeking additives.

Additionally, doping of some polymers changes the characteristics (flexibility, strength) of the polymers to make them unsuitable for packages. Some antistatic packaging materials are sufficiently conductive only in humid environments, thus making these of limited use.

While the fluoronium ion-implanted polymers employed in this invention are known, these polymers have not heretofor been suggested as antistatic packaging materials. Therefore, their suitability as antistatic packaging materials has been unexplored until now.

OBJECTS OF THE INVENTION

An object of this invention is to provide a flexible and strong packaging material for static-sensitive substrates.

A further object of this invention is to provide an antistatic packaging material and method which does not significantly alter the properties of steel substrates packaged within.

Another object of this invention is to provide an antistatic packaging material which does not significantly interact with lubricants commonly applied to precision ball bearings.

A still further object of this invention is to provide an antistatic packaging material and method for which effectiveness is reasonably independent of the humidity at which the package is stored and in which the conductivity remains reasonably constant and does not degrade.

SUMMARY OF THE INVENTION

These and other objects are achieved by the use of a fluorine ion (fluoronium ion, F+) -implanted polymer as a packaging material. F+ ions are implanted into a polymer to give the polymer a surface resistivity of no greater than about $10^{12}$ ohms/sq. The substrate is packaged so that any static charge upon the substrate transfers to the F+-implanted polymer, which forms at least part of a conductive pathway allowing the static charge to dissipate into the environment.

DESCRIPTION OF THE PREFERRED EMBODIMENTS

Figure 1:
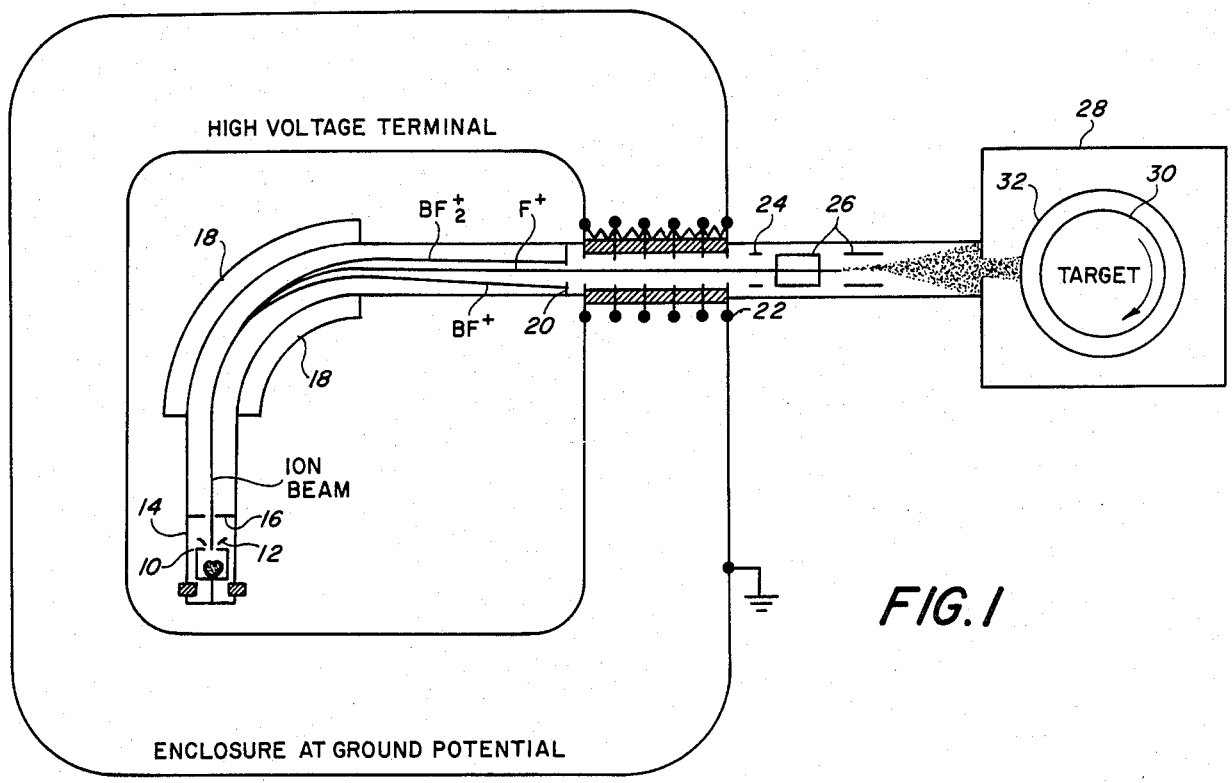
FIG. 1 is a schematic representation of an ion implantation apparatus.

The packaging material of this invention is a fluorine ion (F+)-implanted polymer optionally backed with a flexible, inert, impervious polymer. In this description, and the claims that follow, the term "inert polymer" means any polymer which does not adversely affect the characteristics of the ion-implanted polymer as a packaging material. The term "impervious" means capable of preventing the seepage of deleterious matter (such as dust, oil, etc.) into the package or beneficial matter (e.g. lubricant) out of the package.

The polymers into which the fluorine ion is implanted are preferably polyactylene $(CH)_x$, ethylene/methacrylic acid copolymer (COPOL), or paraphenylene sulfide (PPS). Closely related analogues of these polymers should be equally useful in this invention. Most preferably, polyacetylene is used.

In a preferred embodiment of this invention, polyacetylene is grown by a modified Shirakawa technique upon a polypropylene film to a typical thickness of about 2-5 mils (The thickness of the film is not important to the effectiveness of the ion-implanted polymer. Other thicknesses may be used, depending on the physical requirements the film may need to meet a specific purpose). The exposed surface of the polyacetylene is then F+ ion-implanted to an average concentration from about 5 to about 25 atomic percent of fluorine. Due to the low energy of the ion implantation, the fluorine substitution occurs in a layer centered about 300 angstroms beneath the surface of the polyacetylene. The concentration referred to above is the concentration in this layer and not in the bulk material. Of course if the material to be treated is thin enough then the entire material would have fluorine substitution. The material in this layer exhibits no discernable physical damage, contrasting sharply with previous techniques for adding fluorine to polyacetylene.

The distribution of the fluorine substitution is Gaussian with the maximum substitution occuring at or near the middle of the layer. The maximum concentration is about 60 atomic percent and preferably it is about 50 atomic percent. A maximum concentration that is above 60 atomic percent means that too much of the acetylene polymer has been converted to fluorinated polyethylene. Although any amount of fluorine doping increases conductivity and oxidation resistance, average concentrations below about 5 atomic percent are of little value. It is most preferred that the average concentration is at least about 15 atomic percent which would correspond to a maximum concentration of about 25 to 30 atomic percent.

Fluoronium ions are implanted typically at a fluence of about $1\times 10^{14}$ to about $1\times 10^{18}$ ions/cm$^2$. The fluence and the fluorine concentration are related. In practice the fluence used would be the one which gives the desired fluorine concentration.

The ion beam for implanting the polymer has an energy from about 10 to about 60 KeV. Since the width and depth of the implanted layer depends on the energy of the beam, an energy below 10 KeV would produce a poor implanted layer. An energy above 60 KeV would present serious damage problems due to adverse chemical reactions and overheating. To overcome these problems, the current would have to be reduced, causing longer processing times, and special heat dissipating measures to be taken. The current of the beams is such that the wattage for the beam does not exceed 0.75 watts/cm$^2$ and preferably does not exceed 0.50 watts. The implanting is carried out in a vacumn of a least about $10^{-6}$ Torr.

An example of the apparatus which can be used for implanting the polymers used in this invention is shown in FIG. 1. It is the apparatus used for the following examples.

The apparatus comprises an ion source 10 wherein a fluorine gas, e.g. BF$_3$, is ionized. An extraction electrode 12 at about 25 KeV causes the ions to be propelled from the ion source 10 into the vacumn line 14, fabricated from e.g. stainless steel. The ion beam first passes through an analyzer slit 16 which defines the beam and places it on axis. An analyzer magnet 18 comprising two curved pole faces causes unwanted ions, e.g. B+, and BF+, and BF$_2$, to become off-axis, thereby allowing their removal at the analyzer slit 20. The ions leaving analyzer slit 20 are fluoronium ions which are accelerated and the energy of the beam is increased by the acceleration tube. The electric field of the acceleration tube also helps focus the beam of selected ions from the mass analyzer and impedes the backstreaming secondary electrons. The tube consists of a series of sections, each section being an annular insulator, e.g. glass, and a shaped metal electrode, e.g. polished aluminum, cemented together. A resistor stack distributes the potential drop approximately uniformly along the tube.

Electrostatic quadrupole lens 24 further focusses the beam before it is raster-scanned by two sets of deflection plates 26 which have a voltage of about 5 KeV. The scanning improves the distribution of the atoms being implanted laterally along the surface of the target material 32 in the target chamber 28. The material is attached to a rotating drum or spindle 30.

The primary function of the target chamber is to provide line-of-sight high vacuum access to each area to be implanted. The target chamber acts as a Faraday cup, i.e. a metallic enclosure surrounding the target.

By collecting the ion current at the target in a Faraday Cup and by knowing the area over which the beam is scanned, the number of ions implanted can be measured (usually quoted in units of ions/cm$^2$). A retarding voltage can be applied before the target chamber to slow the ion beam to the desirable energy if energies lower than 25 KeV are desired. Further details can be obtained from NRL Memorandium Report 4341 by F. A. Smidt at pp. 7 to 19 which is incorporated herein by reference.

The potential usefulness of ion implantation in the above device lies in its ability for both lateral and depth resolution. The resolution in the x and y positions can be achieved by masking techniques, while the z position can be varied by changing the energy of the ion being implanted. The final depth position of the implanted ions in the substrate can be calculated by knowing the beam energy and ion mass and the composition and density of the substrate. The resulting concentration profile is usually a Gaussain distribution centered about the calculated range.

The generally acceptable maxiumum surface resistivity for an antistatic packaging material is about $10^{12}$ ohms/sq. Thus, implantation of F+ need be done only to a degree that yields this surface resistivity or better. Typically, a highly useful degree of surface conductivity can be acheived by implanting a band of ions about 400 angstoms wide centered at about 300 angstroms beneath the surface to obtain about 20–50 atomic percent F+ content in the implanted region. Nevertheless, by routine and simple experimentation not involving any inventive skill, other implantation parameters may yield an ion-implanted polymer having the proper surface resistivity. For example, the band of implanted ions may be moved closer to the surface of the polymer, and the concentration of ions in the implanted region correspondingly reduced. From the above discussion it should be clear that except for the obvious requirement that the resulting ion-implanted polymer be stable (polymers having a maximum F+ concentration of over about 60 atomic percent tend to degenerate), all that is important is that the resulting ion-implanted polymer have a surface resistivity no greater than about $10^{12}$ ohms/sq. The method or parameters used in implanting the F+ ions are not critical so long as the desired surface resistivity is obtained in the resulting ion-implanted polymer.

It has been found that while the ion-implanted polymers of this invention exhibit an exceptionally useful surface-resistivity and stability and do not contaminate lubricants typically used with ball bearings, polyacetylene used alone permits seepage of the lubricants and is insufficiently flexible to be practical. Therefore, the polyacetylene to be ion-implanted should be synthesized upon an inert, flexible, impervious polymer which can serve as a backing for the ion-implanted polymer. The other ion-implanted polymers used in this invention are impervious and flexible even when exposed to air. Therefore, unless an opaque package is desired, no backing need be used with ion-implanted polymers other than those closely related to polyacetylene. In those cases where a transparent package is desired (e.g. ball bearing packages), polypropylene is the backing of choice. Of course, in other cases, one may desire an opaque backing polymer to prevent the entry of light therein. The backing polymer may or may not be conductive in and of itself. If a greater degree of charge dissipation is desired than that which can be achieved using only the ion-implanted polymer or the ion-implanted polymer and the inert backing, the outer surface of the ion-implanted polymer or backing polymer may be coated or treated with a substance (e.g. metallic silver) or ion implanted to increase its conductivity in accordance with known methods. In this description and the claims that follow, any coating is considered to be part of surface which it coats unless otherwise specified. Polymer films for which no backing is needed may be made conductive on their inner and outer surfaces by ion implantation of both surfaces of the film or by coating, which is typically less expensive. The resistivity of the outer surface (that surface which forms the outside of the package), should also be no more than about $10^{12}$ ohms/sq. and preferably lower.

Figure 2:
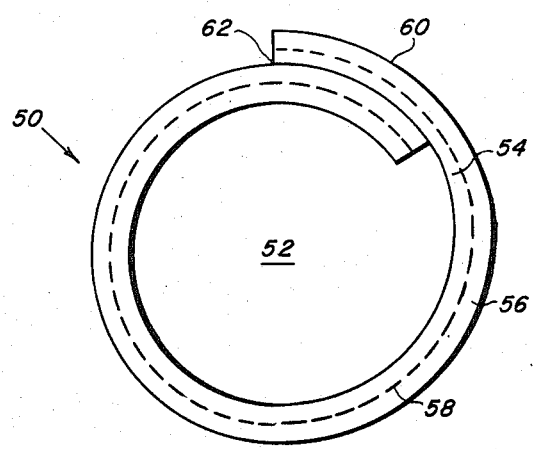
FIG. 2 shows a cross section of a preferred packaging design utilizing the novel antistatic packaging material of this invention.

FIG. 2 shows a cross-section of a preferred design for a package 50 employing the material of this invention. Enclosed within package 50 is substrate 52 (e.g., a lubricated set of precision ball bearings held within a race). Substrate 52 is in contact with the implanted surface of inner layer 54 composed of an $F^+$-implanted polymer. The $F^+$-implanted polymer 54 is backed by outer layer 56 of a flexible, inert, impervious polymer. The interface between the two polymers 58 is graphically illustrated by a dotted line. The outside layer 56 is made conductive by either ion-implantating or by coating its outer surface with a thin layer of metallic silver 60. The package folds back upon itself to form a conductive interface region 62 where inner layer 54 contacts outer layer 60. Preferably, the polymers used are chosen to be heat-sealable (e.g., $F^+$-implanted polyacetylene backed by polypropylene).

In practice static charge from substrate 52 is conducted to inner layer 54. The charge travels along inner layer 54 to conductive interface region 62. At conductive interface region 62, the charge travels to conductive coating 60. Once at conductive coating 60, the charge dissipates into the air.

Other package designs may of course be employed. Any design which creates a path so that static charge may travel from the substrate and dissipate into the air is as suitable as the design shown in FIG. 2. The packaging materials of this invention function independently of the humidity in the environment.

EXAMPLES

Having described the invention generally, the following examples are given as specific examples and to better demonstrate the advantages and features of the invention. It is understood that the examples are given by way of illustration and are not meant to limit the disclosure and the claim that follow in any manner.

Polymers examined were polyacetylene, $((CH)_x)$, polyparaphenylene sulfide (PPS), and a copolymer of ethylene and methacrylic acid (COPOL); the latter two were obtained from commercial suppliers. Polyacetylene was synthesized by a modified Shirakawa technique. Polyacetylene on oriented polypropylene was prepared by coating the substrate film on one side with an appropriate catalyst and then adding the acetylene.

Since unmodified $(CH)_x$ is susceptible to oxidation when exposed to air, samples were chemically doped with either 2% $I^-$ or $PF^-_6$ (for comparison) or ion implanted with $F^+$ to improve their stability. To maintain flexibility during air exposure, $(CH)_x$ was deposited on polypropylene (PP) film prior to $F^+$-implantation. PPS and COPOL, although flexible and stable, to air oxidation were implanted with $F^+$ to decrease their surface resistivities. Composition and selected properties of the films studied are summarized in Table 1.

TABLE I

PHYSICAL PROPERTIES OF FILM MATERIALS

| Composition | Code | Flexibility | Thickness (mil) | Surface Resistivity ($\Omega$/sq) |
|---|---|---|---|---|
| $(CH)_x$ | $(CH)_x$ | flexible | ~4 | $3 \times 10^{11}$ |
| $(CH)_x$ $I^-$ doped | $(CH)_x + I$ | fairly flex. | ~4 | — |
| $(CH)_x$ $FP_6^-$ doped | $(CH)_x + PF_6$ | stiff | ~4 | — |
| $(CH)_x$ $F^+$ implanted | $(CH)_x + F$ | fairly flex. | ~5 | $2 \times 10^7$ |
| $(CH)_x$ $F^+$ implanted, on polypropylene | $(CH)_x + F(PP)$ | flexible | 3 | $5 \times 10^5$ |
| (PPS) $F^+$ implanted | (PPS) $+ F$ | flexible | 3 | $1 \times 10^5$ |
| Copolymer ethylene/methacrylic acid, $F^+$ implanted | COPOL $+ F$ | flexible | 5 | $7 \times 10^7$ |

Substrates were flats of 440C steels, representative of precision miniature bearing steels, metallurgically polished and passivated with sodium dichromate and nitric acid. To ensure surface-chemically clean surfaces, they were ultrasonically cleaned with acetone and fluorinated solvent immediately prior to use.

The four oils employed in this study are listed in Table II. They include: a base stock nonpolar synthetic hydrocarbon derived from the polymerization of $\alpha$-olefins; a formulated version of the above synthetic hydrocarbon; a formulated synthetic hydrocarbon from a different base stock; and a formulated mixture of a polyolester and a diester (Military Specification MIL-L-81846, incorporated herein by reference). The formulations are designed for use with precision miniature bearings. All formulations contained small amounts of antioxidants and other additives.

TABLE II

| LUBRICANTS | |
|---|---|
| Type | Code |
| Synthetic Hydrocarbon, base stock | SHC-B |
| Synthetic Hydrocarbon, formulated[a] | SHC-F |
| Synthetic Hydrocarbon, formulated[b] | SHC-S |
| Polyolester - Diester, formulated | SPDE |

[a]Base stock is SHC-B
[b]Different base stock than SHC-B

Chemical doping of films with iodine was performed by contacting $I_2$ vapor with the $(CH)_x$ for about 15 hours. For $PF_6$ doping, $NOPF_6$ was dissolved in nitromethane and the resulting solution was introduced to the $(CH)_x$. All reactions were carried out under vacuum.

The implantations were performed with a modified VARIAN/EXTRION ™ ion implanter capable of generating 25–200 KeV ions. The ions used were 25 KeV $F^+$ generated by fragmentation of $BF_3$. To reduce effects caused by local heating, the ion beam was maintained at 1–10 μÅ while simultaneously cooling the samples. Rastering the beam across the sample ensured a homogeneous distribution of ions laterally across the surface. The samples were implanted to a total fluence of $1 \times 10^{17}$ $F^+/cm^2$. The energy and fluence used for these implants resulted in a band of implanted ions about 400 angstroms wide centered at about 300 angstroms below the surface, achieving an about 20–50 atomic percent $F^+$ content in the implanted region.

The modified electroactive polymers (EAP's) were placed in long term contact with lubricated and unlubricated bearing steels for 5 months, after which time the surfaces were examined for adverse effects. Specific attention was directed to (a) any transfer from film to the steel substrate causing the steel surface to be non-wettable, (b) any transfer from film to the respective lubricant resulting in altered physical or chemical characteristics of the latter, and (c) physical properties and surface resistivities of the films.

To determine whether such long-term storage results in any deleterious interaction of the films with the bearing steels and/or the lubricants, clean steel surfaces and steel surfaces covered with a layer of each lubricant (approximately 0.5 mm thick) were placed in intimate contact with the respective films care being taken to exclude air. After storage in darkness at 23±2° C. and 50±10% RH for three to five months, films and substrates were separated and inspected visually for physical changes. Subsequently, the liquids remaining on the lubricant-covered surfaces were analyzed by (a) reflectance Fourier Transform IR, (b) photoelectron spectroscopy (XPS), a surface analysis technique sampling depths to 30 angstroms, and (c) by contact angle ($\theta$) measurements for wettability. Surface resistivity of the experimental ion implanted films was measured by a method similar to that contained in Military Specifications MIL-P-82646. incorporated herein by reference. All films examined in this study, including the unmodified $(CH)_x$, exhibited values in the acceptable range. The lower the surface resistivity, the better the packaging material. Surface resistivities of the $F^+$ implanted specimens displayed excellent values and remained unaltered after 5 months contact with the substrates.

Table III summarizes the effects of extended contact of the EAPs and polymer films with the unlubricated bearing steels as well as the lubricants spread on the steel surfaces. Visual examination showed that the undoped $(CH)_x$ film adhered strongly to the steel surfaces so that removal could be achieved only by prying off discrete small fragments of the embrittled film. Because of its porous structure, the $(CH)_x$ film completely absorbed every lubricant layer spread on the substrate with the exception of SHC-S which partially remained on the steel surface as discrete liquid droplets of unchanged color and viscosity. Contact of the I- doped $(CH)_x$ film with either lubricated or unlubricated steel caused the appearance of a dark brown precipitate tenaciously adhering to the metal and removable only by metallurgical polishing: the lubricants, however, remained unchanged, and the films acquired some iridescence. Contact with the $PF_6$-doped $(CH)_x$ did alter the film appearance, but did result in a marked viscosity increase of the contacted lubricants and an opaque adherent residue covering the steel substrates.

Implantation of the $(CH)_x$ film with $F^+$ ions greatly minimized such adverse interactions with lubricants and steels; all remained unaffected after prolonged contact. Porosity of the $(CH)_x$ polymer which permitted seepage of the lubricants through the film was eliminated by preparing the $(CH)_x$ on PP backing prior to $F^+$-implantation; the film then became impervious to liquid penetration, assumed the flexibility of PP and remained inert to the steel substrate and lubricants. Equally promising results were obtained with $F^+$ ion-implanted PPS and COPOL.

TABLE III
EFFECT ON BEARING STEELS AND LUBRICANTS AFTER EXTENDED CONTACT WITH FILMS

| Film | Lubr. | Film | Visual Lubricant | Steel | FTIR |
|---|---|---|---|---|---|
| $(CH)_x$ | None | brittle | — | adherent film | unaffected |
|  | SHC-B | brittle | disappeared | adherent film | — |
|  | SHC-F | brittle | disappeared | adherent film | — |
|  | SHC-S | brittle | diminished | oily droplets | lubr. unaffected |
|  | SPDE | brittle | disappeared | dry | clean steel |
| $(CH)_x + I$ | None | brown ppte | — | brown ppte | unaffected |
|  | SHC-B | iridescent | unaffected | brown ppte + lubr. | lubr. unaffected |
|  | SHC-F | unchanged | unaffected | brown + lubr. | unaffected |
|  | SHC-S | iridescent | unaffected | brown + lubr. | unaffected |
|  | SPDE | iridescent | disappeared | brown dry | clean steel |
| $(CH)_x + PF_6$ | None | iridescent | — | opaque adherent | interaction |
|  | SHC-B | unchanged | thickened | opaque adherent | interaction |
|  | SHC-F | unchanged | thickened | opaque adherent | interaction |
|  | SHC-S | unchanged | thickened | opaque adherent | interaction |
|  | SPDE | unchanged | thickened | opaque + lubr. | interaction |
| $(CH)_x + F$ | None | unchanged | — | unaffected | unaffected |
|  | SHC-B | lubr. seepage | unaffected | unaffected | lubr. unaffected |
|  | SHC-F | lubr. seepage | unaffected | unaffected | lubr. unaffected |
|  | SHC-S | lubr. seepage | unaffected | unaffected | lubr. unaffected |
|  | SPDE | lubr. seepage | unaffected | unaffected | lubr. unaffected |
| $(CH)_x + F(PP)$ | None | slightly darkened | — | unaffected | — |
|  | SHC-F | darkened | unaffected | unaffected | lubr. unaffected |
|  | SPDE | darkened | unaffected | unaffected | lubr. unaffected |
| $(PPS) + F$ | None | unaffected | — | unaffected | — |
|  | SHC-F | unaffected | unaffected | unaffected | lubr. unaffected |

TABLE III-continued

EFFECT ON BEARING STEELS AND LUBRICANTS AFTER EXTENDED CONTACT WITH FILMS

| Film | Lubr. | Film | Visual Lubricant | Steel | FTIR |
|---|---|---|---|---|---|
| | SPDE | unaffected | unaffected | unaffected | lubr. unaffected |
| COPOL + F | None | unaffected | — | unaffected | — |
| | SHC-F | unaffected | unaffected | unaffected | — |
| | SPDE | unaffected | unaffected | unaffected | — |

Figure 3A:
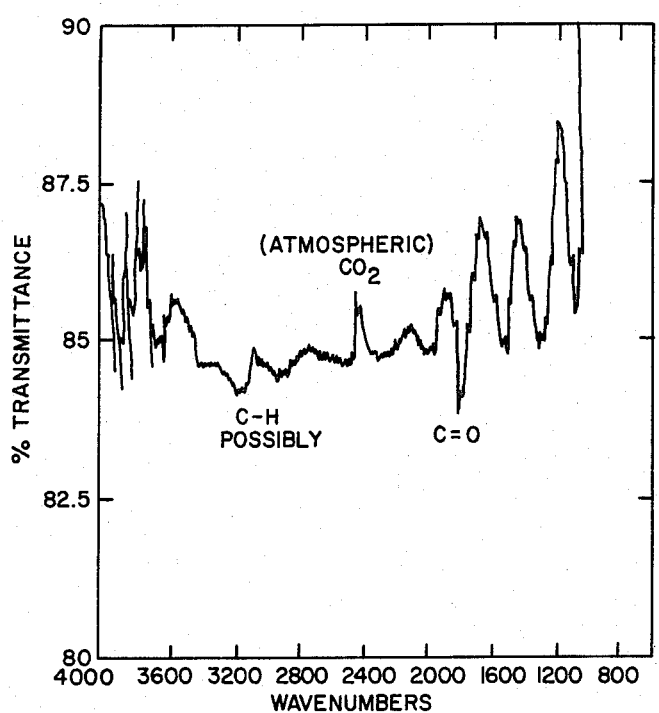
FIG. 3a is a reflectance FTIR spectrum of an unlubricated steel surface after contact with unmodified polyacetylene.
Figure 3B:
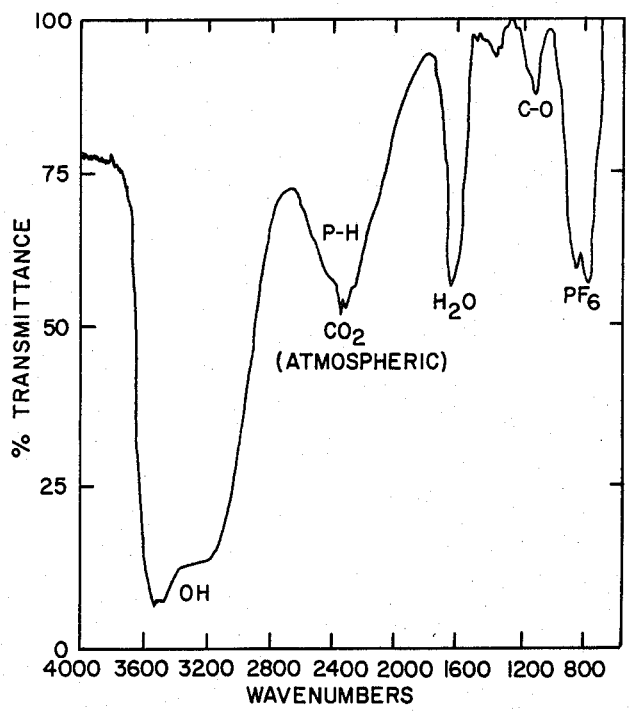
FIG. 3b is a reflectance FTIR spectrum (for comparison) of an unlubricated steel surface after contact with $PF_6$-doped polyacetylene.
Figure 3C:
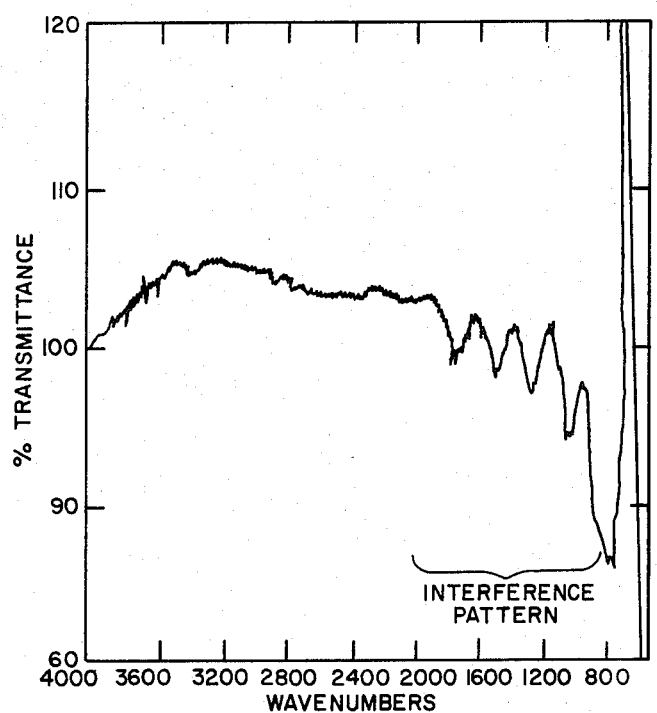
FIG. 3c is a reflectance FTIR of an unlubricated steel surface after contact with F+-implanted polyacetylene.

After visual examination, the unlubricated steel surfaces were analyzed by reflectance FTIR for any residue resulting from film contact. Each spectrum was referenced against that of a clean steel surface to determine whether additional absorption bands were present. Features in the region of C=O bonds (FIG. 3a) indicate transfer of oxidized hydrdocarbons from $(CH)_x$. The $(CH)_x + PF_6$ film produced fairly heavy transfers, shown by the presence of several additional absorption bands, including one at 800 cm$^{-1}$ for the PF bond (FIG. 3b), whereas the spectrum after contact with $(CH)_x + F$ (FIG. 3c) shows no residual matter. Such analysis for each system provided the data for the interactions listed in Table III under the FTIR heading.

Figure 4A:
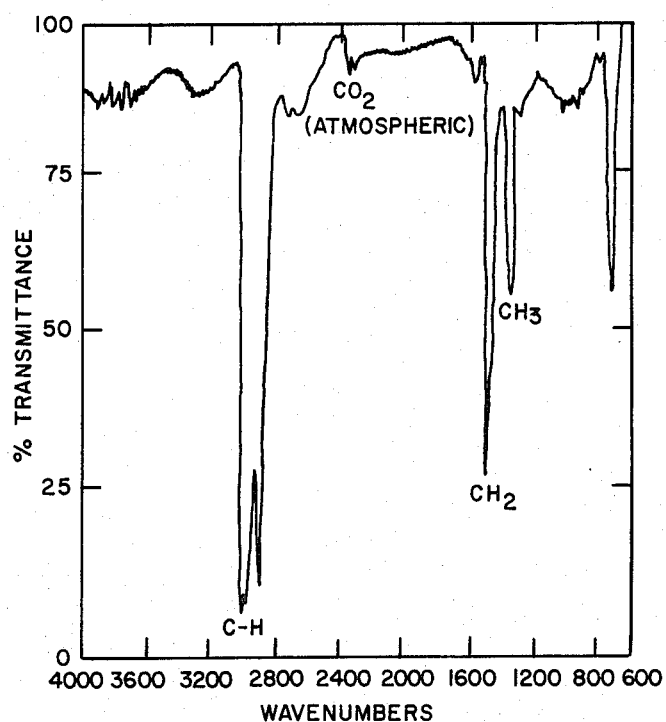
FIG. 4a is an IR spectrum of a synthetic hydrocarbon lubricant used with precision ball bearings.
Figure 4B:
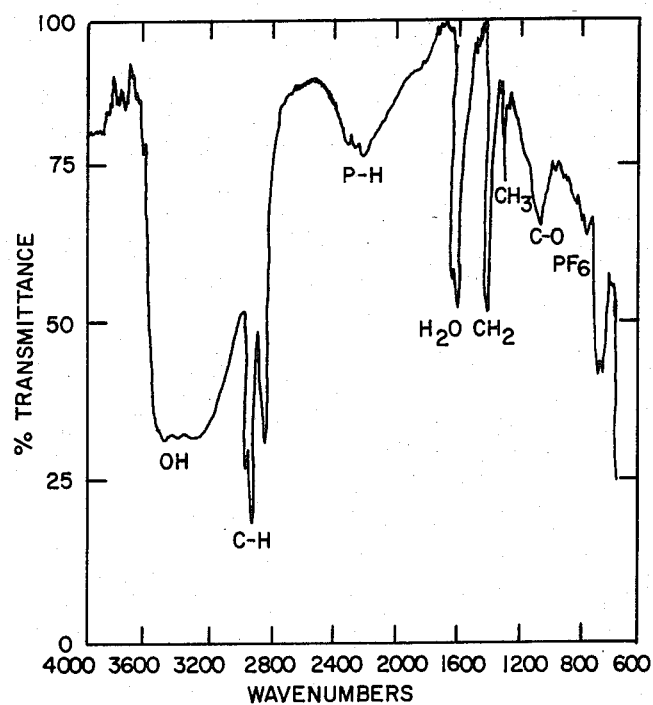
FIG. 4b is an IR spectrum (for comparison) of the lubricant of FIG. 4a after contact with $PF_6$-doped polyacetylene.
Figure 4C:
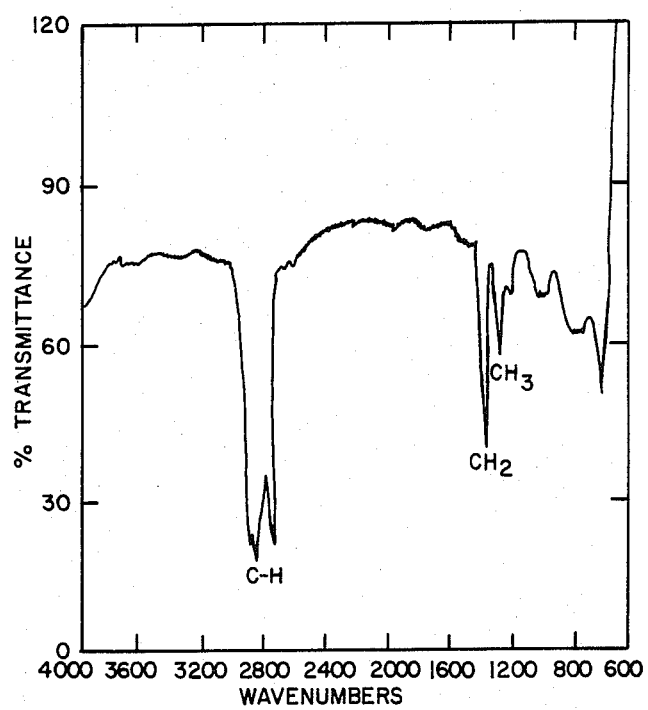
FIG. 4c is an IR spectrum of the lubricant of FIG. 4a after contact with F+-implanted polyacetylene.

The compositions of the lubricants remaining on the steel substrates were also analyzed by FTIR for possible component transfer. Each spectrum was compared with that of the pure lubricant spread on the steel surface. When the spectrum of SHC-F after contact with $(CH)_x + PF_6$ (FIG. 4b) was compared with that of the pure SHC-F on steel (FIG. 4a), additional features in the wavenumber range of 3400, 1650, 1170 and 850 cm$^{-1}$ were observed, clearly establishing interaction of the film with the lubricant. However, the spectrum of SHC-F after contact with $(CH)_x + F$ (FIG. 4c) was identical to that of the pure SHC-F, an indication that the lubricant remained unaffected.

The unlubricated steel surfaces were also examined by XPS for contamination from the contacting films. Table IV lists data of the most prevalent elements on the bearing steel surfaces, both freshly cleaned and after contact with several representative films. The intensities and the line positions serve as indicators of quantity and chemical bonding. Predominant elements were the steel consituents iron (Fe) and Oxygen (0). A binding energy (BE) for O at 530 eV is indicative of iron oxide and at 532-533 eV of organic C-bonded 0 such as carbonyls, alcohols or esters. A definite shift of the predominant 0 peak to a higher BE was observed after contact with the unmodified $(CH)_x$ film, which was not too surprising, given the ready oxidizability of $(CH)_x$. A BE of 285 eV for carbon (C) indicates an aliphatic C—C linkage and is, therefore, characteristic of an almost ubiquitous atmospheric hydrocarbon contamination overlayer, whereas a BE of about 289 eV is characteristic of C bonded to 0. Such shifts toward higher BE for C in conjunction with the shifted 0 signals suggest the presence of organic contamination other than atmospheric. In addition to Fe, 0, and C, large signals of F and traces of P were observed in the steel surface after contact with $(CH)_x + PF_6$. Signals of ionic F$^+$ and traces of F bounded to C were also evident from contact with (PPS)+F, signifying some interaction between (PPS)+F and steel. With the exception of the $(CH)_x + PF_6$ specimen, the essentially unvarying C intensities indicate only traces of contaminants from the films.

TABLE IV

XPS RELATIVE ELEMENTAL INTENSITIES OF BEARING STEEL SURFACE AFTER CONTRACT WITH FILMS
(Normalized to Fe-10)

| | Intensities at Binding Energies (eV) | | | | | | |
|---|---|---|---|---|---|---|---|
| Film | 0(ox) (530) | O-C (532) | C-C (285) | C-O (289) | F (685) | F-C (688) | P (133) |
| None | 23.1 | — | 3.0 | — | — | — | — |
| $(CH)_x$ | 9.0 | 17.8 | 3.0 | 3.0 | — | — | — |
| $(CH)_x + PF_6$ | 10.0 | trace | 2.5 | 0.3 | 15.5 | — | 0.4 |
| $(CH)_x + F$ (PP) | 26.2 | trace | 3.8 | 4.0 | — | — | — |
| (PPS) + F | 25.6 | — | 4.2 | — | 1.3 | 0.8 | — |

Wettability of the unlubricated steel surfaces was determined by contact angle measurements. On a freshly cleaned metal or metal oxide surface, water and tetradecane ($C_{14}H_{30}$) spread spontaneously ($\theta=0°$), and methylene iodide ($CH_2I_2$) exhibits $\theta \leq 20°$. Contact angles larger than those values are indicative of foreign material covering the surface. Table V shows the effect on wettability from contact with some of the films studied. Values similar to those of $(CH)_x$ and several of the other films are characteristic of a layer of atmospheric hydrocarbon contamination, an indication that these materials did not appreciably affect the wettability of the steel surface. The larger values observed after $(CH)_x + F$ on PP contact suggest contamination resulting from O-containing compounds such as esters. Although F was detected by XPS from (PPS)+F contact, it did not affect the wetting of the steel surface. The erratic results on the $(CH)_x + PF_6$ contacted surface was in keeping with the erratic results obtained by the other analyses. There was generally good correlation between the XPS and the wettability results.

TABLE V

WETTABILITY OF STEEL SURFACE AFTER CONTACT WITH FILMS

| | Contact Angle (°) | | |
|---|---|---|---|
| Film | H$_2$O | CH$_2$I$_2$ | C$_{14}$H$_{30}$ |
| $(CH)_x$ | 52 | 40 | spreads |
| $(CH)_x + PF_6$ | 30[a] | 39[b] | spreads[c] |
| $(CH)_x + F$ | 50 | 39 | spreads |
| $(CH)_x + F$ (PP) | 78 | 46 | spreads |
| (PPS) + F | 55 | 35 | spreads |

[a]drop interacts
[b]drop sinks into residue
[c]drop dissolves residue

Obviously, many modifications and variations of the present invention are possible in light of the above teachings. It is therefore to be understood that, within the scope of the appended claims. the invention may be practiced otherwise than as specifically described.

What is claimed and desired to be secured by Letters Patent of the United States is:

1. An antistatic packaging material comprising an inert, flexible, impervious electroactive polymer film having an F+-implanted surface with a surface resistivity of no more than about $10^{12}$ ohms/sq. and an opposite surface also having a surface resistivity no greater than about $10^{12}$ ohms/sq.

2. The material of claim 1 wherein said electroactive polymer is selected from the group consisting of F+-implanted polyacetylene, ethylene/methacrylic copolymers and paraphenylene sulfide.

3. The material of claim 2 wherein said electroactive polymer has a band of F+ ions centered at about 300 angstroms beneath said implanted surface.

4. The material of claim 3 wherein said band of F+ ions is about 400 angstroms wide.

5. The material of claim 4 wherein the maximum concentration of F+ ions in said implanted region is about 20–60 atomic percent.

6. The material of claim 5 wherein the maximum concentration of F− ions in said implanted region is about 20–50 atomic percent.

7. The material of claim 6 comprising a polypropylene backing, the outer surface of which comprises said opposite surface of said film.

8. The material of claim 2 wherein said electroactive polymer is F+-implanted polyacetylene.

9. The material of claim 8 wherein said electroactive polymer has a band of F+ ions centered at about 300 angstroms beneath said implanted surface of said polymer.

10. The material of claim 9 wherein said band of F+ ions is about 400 angstroms wide.

11. The material of claim 10 wherein the maximum concentration of F+ ions in said implanted region is about 20–60 atomic percent.

12. The material of claim 11 wherein the maximum concentration of F+ ions in said implanted region is about 20–50 atomic percent.

13. The material of claim 12 comprising an inert, impervious, flexible backing polymer comprising polypropylene.

14. A substrate package comprising:
a substrate comprising steel and
one or more polymers, with each polymer being ion-implanted on its surface with F+ ions to yield a surface resistivity at said polymer surface no greater than about $10^{12}$ ohms/sq, said one or more F+ ion implanted polymers being disposed such that the implanted surface thereof is in contact with said substrate so that any static charge that develops upon said substrate transfers to said F+ ion implanted polymer and is subsequently dissipated.

15. The substrate package of claim 14 wherein said polymer is selected from the group consisting essentially of polyactylene, ethylene methacrylic copolymers, and paraphenylene sulfide; said polymer having an F+ ion implanted band of F+ ions centered about 300 angstroms beneath said polymer's surface; said polymer having an F+ ion implanted band of F+ ions about 400 angstroms wide; and said F+ ion implanted band having a concentration of F+ ions of about 20–60 atomic percent.

* * * * *